April 13, 1937. A. G. HEGGEM 2,076,839

VALVE

Filed Nov. 7, 1935 4 Sheets-Sheet 1

Inventor:
Alfred G. Heggem,
By: Smith, Michael
and Gardiner, Attorneys.

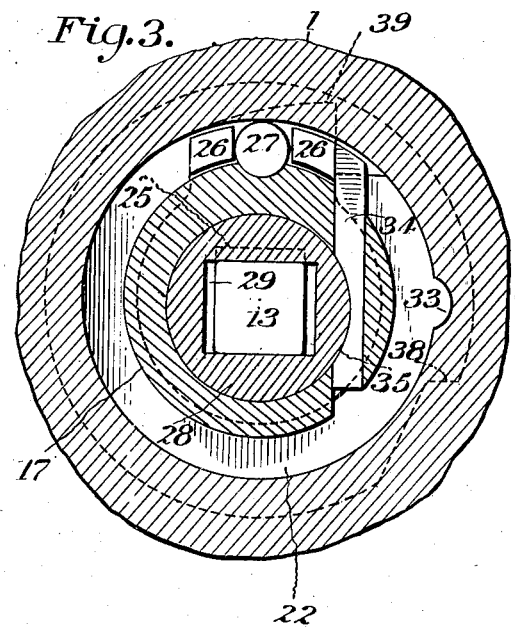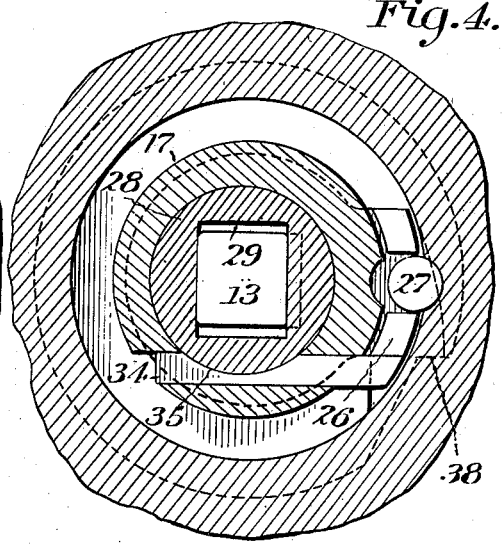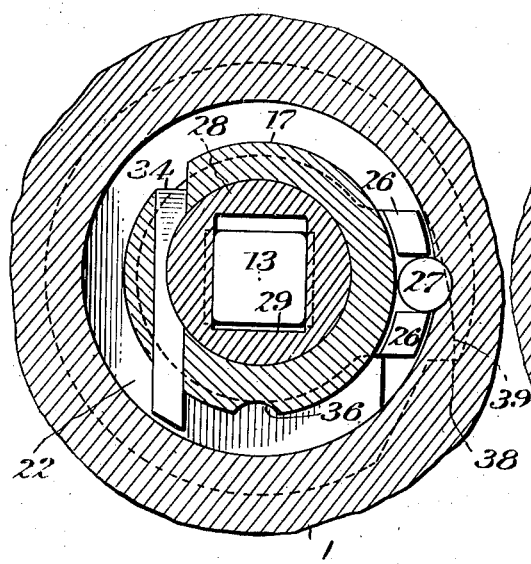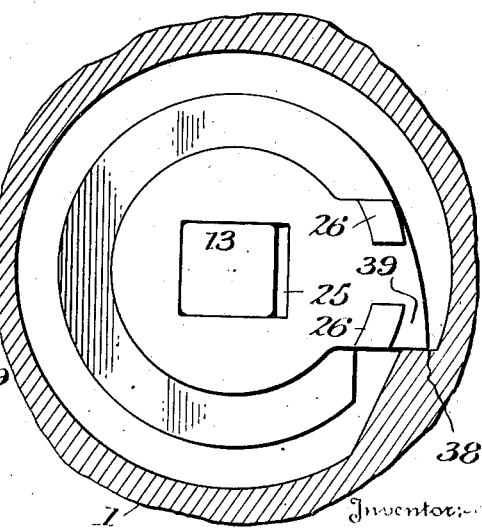

April 13, 1937.    A. G. HEGGEM    2,076,839
VALVE
Filed Nov. 7, 1935    4 Sheets-Sheet 3

Inventor:-
Alfred G. Heggem,
By: Smith, Michael and Gardiner,
Attorneys.

April 13, 1937.                    A. G. HEGGEM                    2,076,839
                                      VALVE
                              Filed Nov. 7, 1935                4 Sheets-Sheet 4

Inventor:-
Alfred G. Heggem,
By Smith, Michael & Gardiner
Attorneys.

Patented Apr. 13, 1937

2,076,839

UNITED STATES PATENT OFFICE 2,076,839

VALVE

Alfred G. Heggem, Tulsa, Okla., assignor of one-third to Ed D. Ligon and one-third to William O. Ligon, both of Tulsa, Okla.

Application November 7, 1935, Serial No. 48,737

9 Claims. (Cl. 251—91)

This invention relates generally to valves, and is more particularly concerned with valves of the type wherein a valve core or other fluid controlling element is rotated and rocked or tilted within a valve body in moving from open to closed position and vice versa. For an example of the type of valve here referred to, reference is made to my former Patent No. 1,989,009, issued January 22, 1935.

Valves of the type here referred to find particular utility in fields wherein fluid under high pressure must be handled, such as encountered in oil well casings, pipe lines and the like. The valves are characterized by a rotative movement for swinging the valve from a position in which its passage is aligned with the inlet and outlet passages of the valve body, to a position in which the passage of the valve is out of alignment with said passages, and this rotative movement is followed by a non-rotative movement, generally tilting or rocking in character, by which a valve face carried by the valve core is moved positively into firm seating engagement with a valve seat associated with the valve body. Heretofore, in valves of this general type, the valve core in the fully closed position of the valve was not truly vertical, so that the cooperating faces of the valve core and valve body must needs be disposed slightly inclined to a vertical plane.

The present invention provides means for sequentially or alternately rotating and tilting a valve of this general character in a manner such that the valve core in its fully closed position will lie in a substantially vertical position with the cooperating valve faces of the core and body also in a substantially vertical plane.

The operating mechanism forming the subject-matter of the present invention also contemplates the use of a rotatable valve operating member and means interposed between it and the valve core for concurrently rotating and tilting the valve in one direction during a partial rotation of the valve operating member, followed by a rocking or tilting of the valve core in the opposite direction upon continued rotation of the valve operating member in the same direction, and while the valve core is restrained against rotative movement.

More particularly, the means for operating the valve includes a rotatable guide member having a driving connection with the valve core and means for selectively rotating said guide means and locking the same against rotation while permitting relative shifting of the valve core with respect to said guide. The valve operating means also contemplates the provision of eccentric means for shifting the valve core with reference to its guide means, and selective clutch means for rotating the guide means and said eccentric means together during a portion of the rotation of the valve operating member and relative to one another during another portion of the movement of the valve operating member.

The invention also contemplates a novel arrangement of associating an operating handle with a rotatable valve operating member in a manner such as to insure against leakage of fluid from the valve body around the rotatable operating means.

These and other objects of the invention will become apparent from a reading of the following specification in connection with the accompanying drawings, wherein I have illustrated a preferred embodiment of the invention, the important and novel features of which have been pointed out more clearly in the appended claims.

In the accompanying drawings:

Fig. 3 is a fragmental section taken on the line 3—3 of Fig. 1.

Fig. 4 is a fragmental section taken on the line 4—4 of Fig. 9.

Fig. 5 is a fragmental section taken on the line 5—5 of Fig. 7.

Fig. 6 is a fragmental section similar to that shown in Fig. 4 with the parts overlying the guide disk having been removed.

Figure 1:
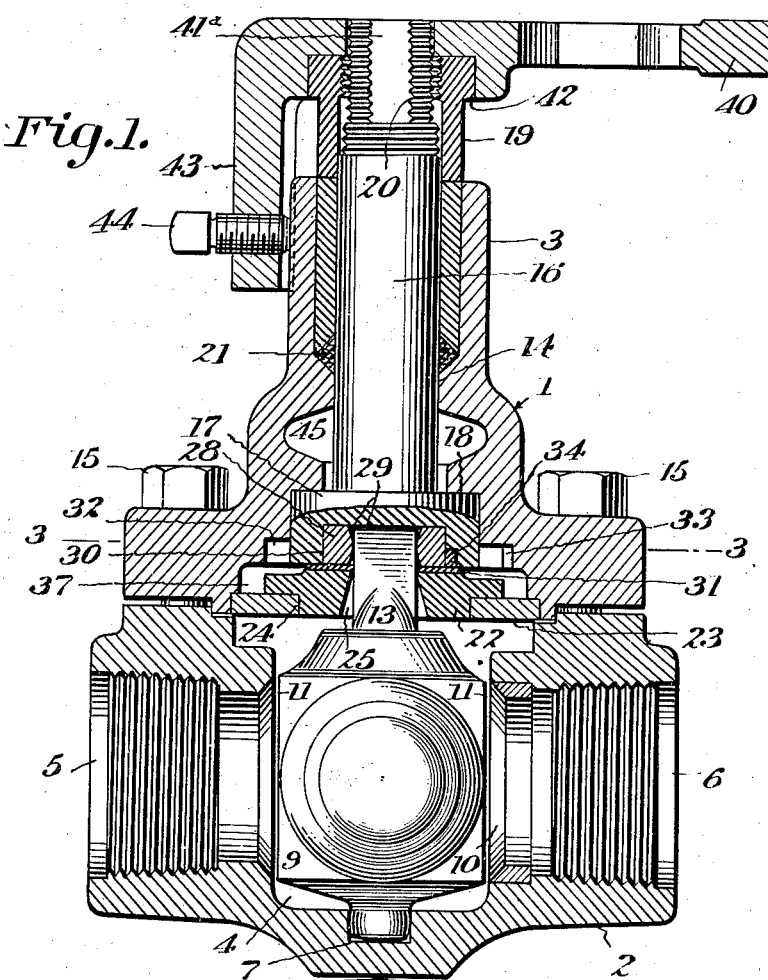
Figure 1 is a transverse vertical, sectional view of a valve embodying my invention, the valve core and associated parts being shown in the fully open position of the valve.
Figure 2:
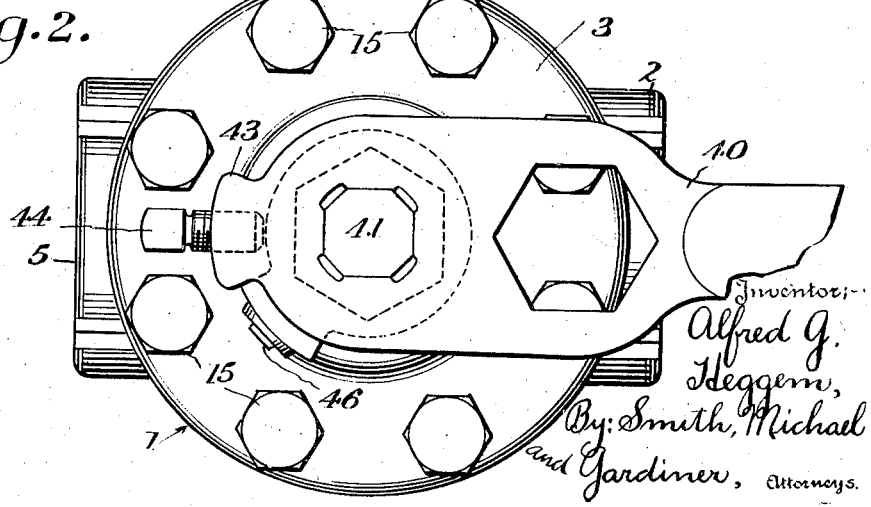
Fig. 2 is a top plan view of the valve shown in Fig. 1.

Referring more particularly to the accompanying drawings wherein like reference numerals are used to designate like parts throughout, the valve body is indicated generally by the reference character 1 and is shown as comprising a lower casing section 2 and an upper casing section 3. The lower casing section 2 is provided with a central, substantially cylindrical valve core chamber 4 communicating with diametrically opposed inlet and outlet passages 5 and 6, respectively. The lower wall of the chamber 4 is provided with a centrally disposed recess 7 designed to receive a trunnion 8 projecting centrally from the lower face of a valve core 9 mounted within the chamber 4 for rotative and tilting or rocking movements therein. To facilitate rocking movement of the core 9, said trunnion 8 is generally spherical in configuration, as clearly shown in the drawings.

The valve core chamber 4 opens upwardly through the top of casing section 2, and the chamber is dimensioned to permit the valve core 9 to be readily inserted and withdrawn through said opening. The outlet passage 6 of the casing section 2 at the inner end thereof where it communicates with the chamber 4 is provided with a valve seat 10, it being noted that said seat is disposed in a substantially vertical plane. The valve core 9 is provided with diametrically opposed flat faces 11 through which open a fluid passage 12 extending transversely through the valve core and dimensioned and arranged with reference to the passages 5 and 6 of the casing section 2, so that when the valve is in the fully open position shown in Fig. 1, said passage 12 is in substantial alignment with the passages 5 and 6. The core member 9 is provided on that face opposite the trunnion 8 with an axial extension or valve stem 13. As shown in the several views of the drawings, the stem is non-circular in configuration and preferably square.

The casing section 3 is provided with an axial bore 14 and said casing section is secured to the casing section 2 by means of suitable cap screws or the like 15 with the axis of bore 14 in substantial alignment with the axis of rotation of the valve core 9 passing through the center of the trunnion recess 7. A valve operating member 16 is mounted for rotation with the bore 14, said operating member terminating at its lower extremity in an enlarged concentric circular head 17. The bore 14 of the casing section 3 is enlarged at its lower end to receive said circular head 17 and said head is retained in snug fitting engagement with the shoulder 18 by a packing gland 19 in threaded engagement with the upper threaded extremity 20 of the operating member 16. It will be noted from this construction that, as the gland 19 is threaded downwardly upon the operating member 16 into engagement with suitable packing material 21, said gland 19 functions as a thrust collar to draw the head 17 into snug engagement with the shoulder 18 of the casing section 3. This construction insures against leakage through the bore 14 of the casing section 3 around the operating member 16 and enlarged head 17 thereof.

Figure 10:
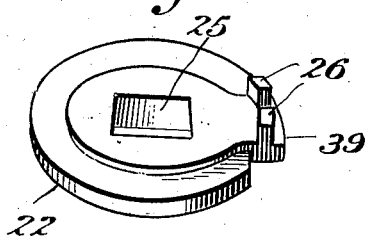
Fig. 10 is a detail perspective view of the guide disk.

Interposed between the operating member 16 and the valve core 9 are disposed motion converting and transmitting means designed to convert continuous rotative movement of the operating member 16 into combined rotative and tilting movement of the valve core 9 during one phase of its movements, and into tilting or rocking movements of the valve core in another phase of its movement. The motion converting and transmitting means shown in the drawings comprises a valve core guide member 22 which is rotatably mounted within the casing section 3 in a suitable journal ring 23 pressed into the lower open end of an enlarged portion of the bore 14. The guide disk 22 is shown in detail perspective in Fig. 10 of the drawings and comprises a generally circular disk having a reduced circular bearing portion 24 rotatably fitted within the central opening of the journal ring 23. The guide disk is provided with a non-circular opening 25 disposed centrally thereof, said opening being generally rectangular with the major axis thereof disposed in line with a clutch element carried by said disk and comprising a pair of upstanding spaced lugs 26, as clearly shown in Fig. 10. The lugs 26 are spaced a short distance on each side of the diameter passing through the major axis of the opening 25 and are designed to drivingly engage a roller clutch element 27.

As shown in Fig. 1, the valve stem 13 penetrates the opening 25 of the disk 22, it being noted that the minor dimension of the opening 25 corresponds substantially to the side dimension of the square valve stem 13. Thus, the stem 13 is restrained against movement relative to the guide disk 22 except as to straight line movement within the slot or opening 25 and in an amount determined by the difference between the major dimension of said slot and the side dimension of said square valve stem. Superposed upon the guide disk 22 is a circular collar 28, the same being provided with a centrally disposed rectangular aperture 29 in which is engaged the upper extremity of the square valve stem 13. The opening 29 is of substantially the same dimensions as the opening 25 of the guide disk 22, and the walls of said opening 29 as well as those of the opening 25 are chamfered or rounded for the purpose of permitting relative tilting or rocking movement of the valve stem 13 with respect to the disk 22 and the collar 28.

The collar 28 is received within an eccentrically disposed socket 30 provided in the exposed face of the enlarged head 17, and interposed between the collar 28 and the disk 22 is a suitable packing and bearing ring 31, the same being provided with a central square opening corresponding in size to the square valve stem 13.

Figure 11:
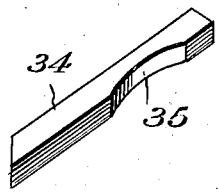
Fig. 11 is a perspective view of one of the clutch elements.

The valve casing section 3 adjacent the lower edge of the enlarged head 17 is provided with an annular recess 32, the vertical wall of which is provided with an arcuate recess 33 for the purpose of partially receiving and housing the clutch roller 27 during operation of the mechanism, in a manner to be hereinafter more clearly described. The enlarged head 17 of the valve operating member 16 is provided with an eccentrically disposed laterally extending tooth or lug 34, shown in detail perspective in Fig. 11, said lug extending transversely through the wall of the head 17 which defines the eccentric opening or socket 30. That portion of the lug which extends through said opening is cut away as indicated at 35 for the purpose of maintaining the circular configuration of the socket 30. As shown in Figs. 3, 4, and 5, the lug 34 projecting laterally beyond the exterior surface of the head 17, is arranged to move within the annular recess 32 formed in the casing section 3. Also, referring to Figs. 3, 4, 5, and 6, it will be noted that the clutch lugs 26 carried by the disk 22 are arranged to project upwardly into the recess 32 for moving the roller clutch element 27 therein.

It is to be here noted that the annular recess 32 surrounding the head 17 has a diameter such that the annular space between the head 17 and the vertical wall of said recess is less than the diameter of the roller clutch element 27. Thus, as shown in Fig. 5, the enlarged head 17 is provided with an arcuate recess 36 disposed in line with the axis of eccentricity of the socket 30, and the recess 36, as clearly shown in Fig. 3, provides for operatively clutching the disk 22 to the enlarged head 17 of the valve operating member 16 by partially receiving the clutch roller 27 carried by the disk 22 between the upstanding lugs 26. Thus, with the position of the parts as shown in Fig. 3, rotation of the enlarged head 17 through the operating member 16 causes rotation of the disk 22 through the driving engagement of the clutch roller 27.

The valve casing 3 intermediate the journal ring 23 and the annular recess 32 is provided with a further annular recess 37 greater in diameter than the recess 32. The wall of the recess 37 at a point clockwise beyond the arcuate recess 33 is provided with an inwardly projecting tooth or abutment 38, to be engaged by a cooperating and laterally projecting tooth or abutment 39 provided on the disk 22. The abutment 38 in the wall of the casing section 3 and the abutment 39 carried by the rotatable disk 22 are relatively positioned to be in engagement when the arcuate recesses 33 and 36 carried, respectively, by the vertical wall of the recess 32 and the outer surface of the enlarged head 17 of the valve operating member 16, are aligned on a line passing radially through the axis of rotation of the valve core member, as shown in Fig. 4. With the parts in this position it is apparent that the clutch roller 27 may pass out of the recess 36 of the driving head 17 and be received within the recess 33 of the valve casing section 3 for the purpose of locking the guide ring 22 against further rotation with respect to the casing. Continued rotation of the enlarged driving head 17 results in relative movement between said head and the disk 22 until the parts assume the position shown in Fig. 5, which corresponds to the fully closed position of the valve. When the direction of the rotation of the driving head 17 is reversed, the laterally projecting lug or tooth 34 carried by the head 17 will, upon the parts assuming the position shown in Fig. 4, pick up the disk 22, thereby causing the clutch roller 27 to pass from the recess 33 into the recess 36, whereupon further movement of the valve operating member 16 and driving head 17 causes simultaneous rotation of the disk 22 and the head 17.

Figure 7:
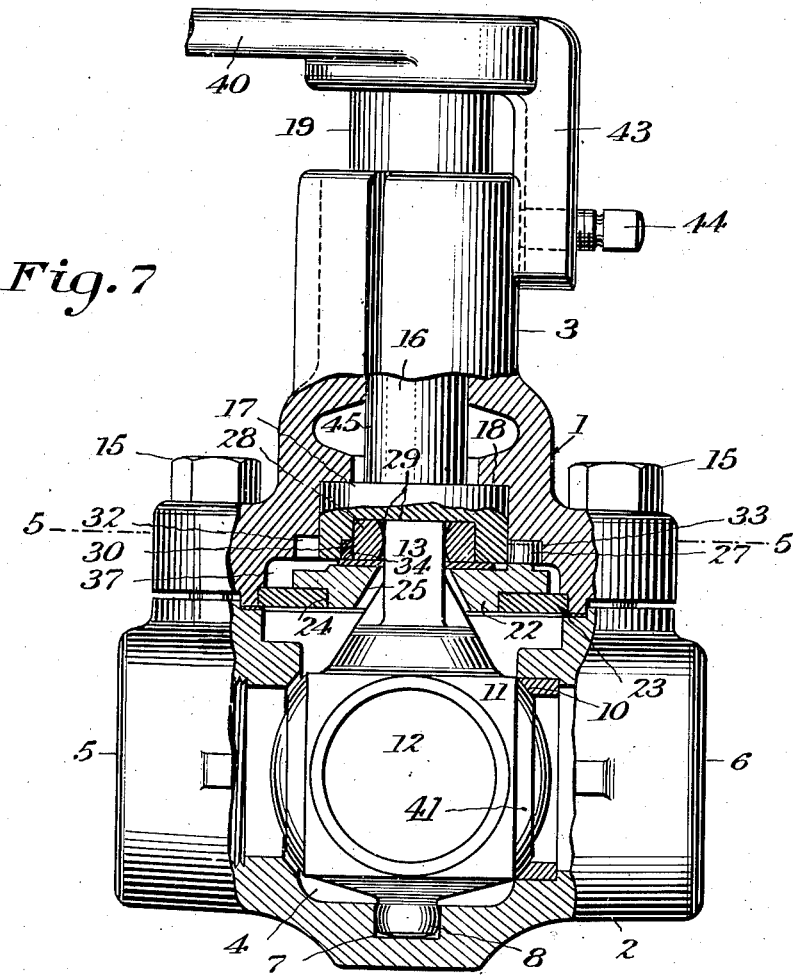
Fig. 7 is a fragmental vertical section of a valve embodying my invention and showing the valve core and associated parts in the fully closed position.
Figure 9:
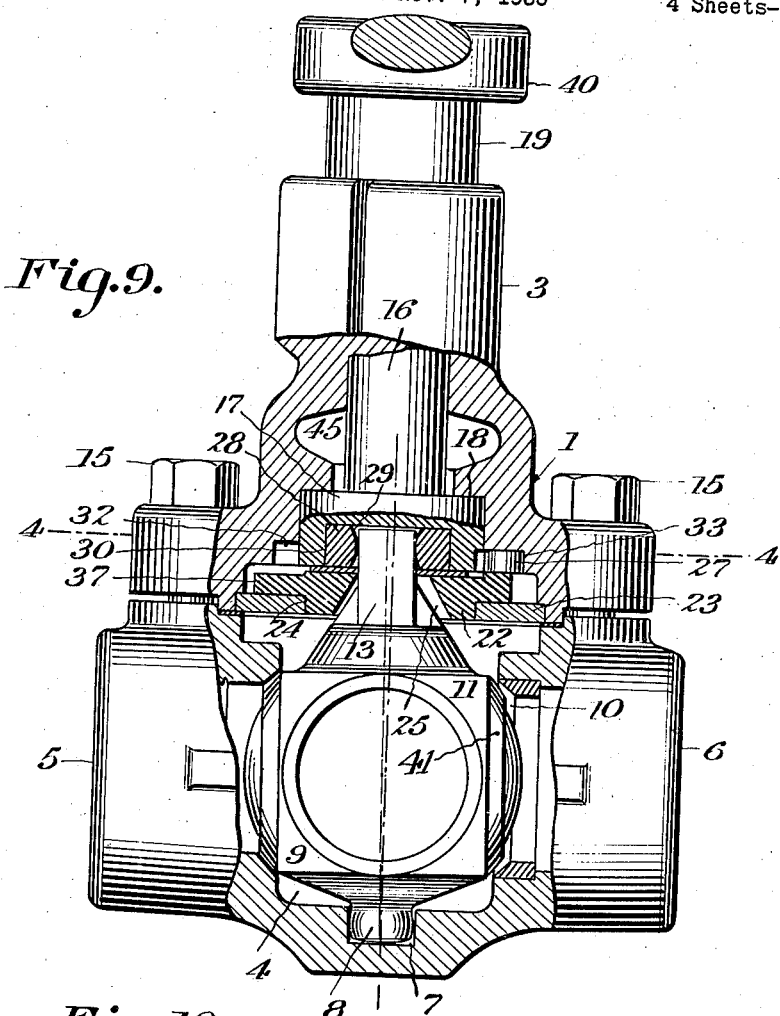
Fig. 9 is a fragmental vertical sectional view of a valve embodying the features of my invention showing the valve core and associated parts in a position at the end of the rotative movement of the valve core from open to closed position and just prior to the tilting or rocking of the valve in the fully closed position.

In order that the operation of the disk member 22 and the collar 28 with respect to defining the desired movement of the valve core 11, may be thoroughly understood, it will be noted that in the original assembly of the valve parts the valve core 9 is positioned in the fully open position as shown in Fig. 1. The valve guide 22 is disposed with its clutch lugs 26, 26 substantially at right angles to the direction of flow through the valve or at right angles to the position said disk occupies in the fully closed position of the valve. In this position, as shown in Fig. 3, the major axis of the rectangular opening 25 of the disk is also at right angles to the direction of flow through the valve. The collar 28 is arranged with the major axis of the aperture 29 thereof at right angles to the major axis of the opening 25 and the driving head 17 is positioned so that the axis of eccentricity of the socket 30 thereof is in substantial alignment with the major axis of the opening 25 of the disk 22. This disposition of the parts is clearly shown in Fig. 3 from which it will be understood that the axis of rotation of the valve core is disposed in a vertical plane substantially midway between the flat faces 11 of the valve core and slightly inclined with respect to a vertical plane at right angles to the plane in which said axis is disposed. Thus, as shown in Fig. 3, the valve stem 13 is in engagement with one end wall of the rectangular opening 25 of the disk 22 and occupies a position substantially midway between the ends of the rectangular opening 29 of the collar 28. Upon rotation of the operating member 16 in a clockwise direction by means of a suitable handle 40, the driving head 17 is moved from the position shown in Fig. 3 to the position shown in Fig. 4, during which movement, due to the position of the clutch roller 27, the disk 22 moves with said head until the tooth 39 carried by the disk engages the abutment 38 provided with the annular recess 37, at which point the roller clutch 27 passes from the recess 33 into the recess 36 and locks the disk against further movement while simultaneously releasing the driving head 17 for further rotation independently of the disk 22. In moving from the position of the parts shown in Fig. 3 to the position shown in Fig. 4, namely, an advance clockwise rotation of substantially 90 degrees, it will be noted that due to the driving engagement between the disk 22 and the stem 13 of the valve core, and, further, due to the driving engagement between said stem and the collar 28, the valve core 9, valve stem 13, disk 22, collar 28, and driving head 17 all rotate as a unit. Due, however, to the eccentricity of the socket 30 in the head 17, the valve stem 13 during said movement, is rocked or tilted slightly away from the plane of the valve seat 10, into the position shown in Fig. 9, at which time the valve stem 13 is centrally disposed with respect to the direction of flow of the valve or, in other words, the center axis of the valve core is disposed in a vertical plane passing centrally through the valve body in line with the direction of flow. The relative position of the valve stem 13 with respect to the slots or openings 29 and 25 of the collar 28 and guide disk 22, respectively, is, however, unchanged inasmuch as all of these parts rotate as a unit throughout the first quarter turn of the driving head 17. Upon further movement of the driving head 17 from the position shown in Fig. 4 to that shown in Fig. 5, the valve core moves from the position shown in Fig. 9 to the position shown in Fig. 7, in which latter position the valve is fully closed. One feature of the invention is to provide a strictly straight line motion for the valve core during this last increment of movement, and this is accomplished by the rotation of the driving head 17 with respect to the disk 22 through the means of the eccentrically mounted disk 28 and the relative shifting thereof due to its eccentricity upon rotation of the head 17 relative to the collar 28. It will be noted that due to the driving connection between the square valve stem 13 and the rectangular openings in the disk 22 and collar 28, the collar 28 is locked against rotation with the driving head 17 as soon as the disk 22 is locked against further rotation with respect to the casing by means of the engagement between the tooth 39 and the abutment 38 and the clutch roller 27 dropping into the recess 33. Thus, as the driving head 17 is rotated from the position shown in Fig. 4 to the position shown in Fig. 5, the collar 28 is moved or shifted, due to its eccentric mounting, toward the plane of the valve seat 10, and this shifting moves the valve stem 13 within the rectangular opening 25 of the disk 22 to bring a valve face 41 of the valve core 9 into firm seating engagement with the valve face 10 of the casing section 2, as clearly shown in Fig. 7. It will be noted in this position of the parts that the vertical center line through the valve stem 13 coincides with a true vertical axis through the recess 7 of the valve casing 2, which recess defines the axis of rotation of the valve core. It should be here noted that the rectangular configuration of the opening 29 of the collar 28 provides for the relative movement of the collar 28 and the valve stem 13 in a direction at right angles to the line of flow during the final increment of rotation of the driving head 17, so that in the final position of the parts as shown in Fig. 5, the collar 28 has shifted slightly in a direction transverse to the line of flow to bring one end wall of the opening 29 in close proximity to an adjacent face of the valve stem. In moving the valve core from closed position as shown in Fig. 7, to open position as shown in Fig. 1, said valve core, during the first 90 degrees of counterclockwise movement, is rocked or tilted away from the valve seat 10 into the position shown in Fig. 9, and is thereafter rotated and rocked into the position shown in Fig. 1, wherein the flat faces 11 of the valve are concentrically disposed with respect to the center of the chamber 4.

In order to guard against relative rotation of the operating member 16 with respect to the packing gland 19, which, as above noted, is screw-threadedly engaged with the operating member 16, I provide the handle 40 with a dual non-circular socket portion for simultaneously engaging a non-circular portion 41ᵃ of the operating member 16 and the non-circular head 42 of the packing gland 19. By this arrangement it is at once apparent that in all operations of the handle 40 for the purpose of rotating the operating member 16, the member 16 and the gland 19 are interlocked against relative rotation. As an added feature, the valve operating handle 40 may be provided with a depending apron 43 disposed in close proximity to the upper end of the casing section 3, and said apron may carry a set screw 44 for the purpose of locking the valve handle in any desired position.

Figure 8:
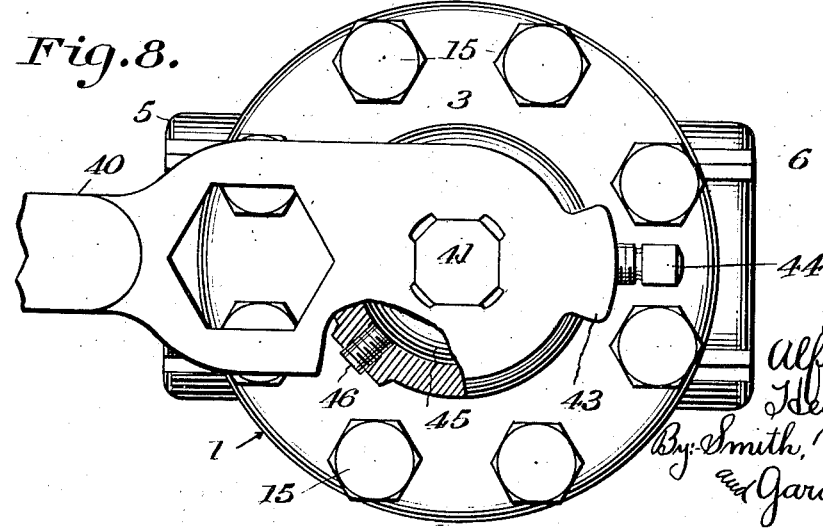
Fig. 8 is a plan view partly in section of the valve shown in Fig. 7.

To further insure against leakage between the valve casing and valve operating member 16, I provide the valve casing section 3 with a grease compartment 45 disposed intermediate the ends of the operating member 16, said compartment being provided with a filling aperture normally closed by a removable plug 46, as clearly shown in Fig. 8.

From the foregoing description it is apparent that I have provided a valve operating mechanism of particular utility with respect to valves including core members mounted for rotary and rocking movements in being moved from open to closed position and vice versa. More particularly, the invention as described is desirable in that it provides means for transmitting continuous rotary movement of an operating element into combined rotary and tilting movement in one phase of its rotation and into rocking movement of the valve in another portion of its rotary movement. An operating means functioning in this particular manner enables the valve in its fully closed position to be disposed with its axis in a truly vertical position and the cooperating valve faces to be disposed in a vertical plane.

It will be understood that although I have chosen to illustrate a preferred embodiment of my invention in the accompanying drawings, such illustration is by way of example and not for the purpose of limiting the invention, inasmuch as the important and novel features of the invention are set forth more particularly in the appended claims, and the right is reserved to make such minor changes in details of construction and arrangement of parts as fairly fall within the scope of such claims without departing from the spirit of the invention.

Having thus described the invention what I claim is:

1. A valve comprising a valve body having inlet and outlet passages, a valve core mounted within the valve body for rotative and tilting movements, a valve stem operatively connected to said valve core and provided with spaced guide faces, a valve stem guide mounted for rotation within the valve body and having guide faces engaging the guide faces of said stem, means for rotating the valve stem guide and means for shifting said valve stem with respect to said guide transversely of the axis of rotation thereof to tilt the valve core.

2. A valve comprising a valve body having inlet and outlet passages, a valve core mounted within the valve body for rotative and tilting movements, a valve stem operatively connected to said valve core and provided with spaced guide faces, a valve stem guide mounted for rotation within the valve body and having an opening within which said valve stem engages, said valve stem and said opening being dimensioned to restrain relative movement between the stem and guide in one direction while permitting relative movement in a direction transverse thereto, means for rotating the valve stem guide, and means for shifting said valve stem with respect to said guide transversely of the axis of rotation thereof to tilt the valve core.

3. A valve comprising a valve body having inlet and outlet passages, a valve core mounted for rotative and tilting movement within said valve body, guide means rotatably mounted within the valve body, said valve core and guide means having cooperating guide surfaces limiting relative movement therebetween to straight line motion, means for rotating the valve core, and means for shifting the valve core with respect to said guide means for tilting the valve core about an axis transverse to the axis of rotation thereof.

4. A valve comprising a valve body having inlet and outlet passages, a valve core mounted for rotative and tilting movement within said valve body, a valve stem operatively connected to the valve core, guide means rotatably mounted within the valve body, said valve stem and guide means having cooperating guide surfaces limiting relative movement therebetween to straight line motion, means for rotating the valve core, and means for shifting the valve core with respect to said guide means for tilting the valve core about an axis transverse to the axis of rotation thereof, including a collar non-rotatably engaging the valve stem and means for shifting said collar within the valve body transversely of the axis of rotation of the valve core to tilt the valve core.

5. A valve comprising a valve body having inlet and outlet passages, a valve core mounted for rotative and tilting movement within said valve body, guide means rotatably mounted within the valve body, said valve core and guide means having cooperating guide surfaces limiting relative movement therebetween to straight line motion, rotatable valve operated means for actuating the valve core and means interposed between the valve operating means and said valve core for sequentially rotating and tilting the valve core in response to rotation of the valve operating member in one direction, and means for shifting the valve core with respect to said guide means for tilting the valve core about an axis transverse to the axis of rotation thereof.

6. A valve comprising a valve body having inlet and outlet passages, a valve core mounted for rotative and tilting movement within said valve body, a valve stem carried by the valve core, guide means rotatably mounted within the valve body, said valve stem and guide means having cooperating guide surfaces limiting relative movement therebetween to straight line motion, a collar engaging the valve stem and shiftable within the valve body transversely of the axis of rotation of the valve core to tilt the valve core, a rotatable valve operating member mounted in substantial axial alignment with the axis of rotation of the valve core, said valve operating member being provided with an eccentrically disposed recess in which said collar is rotatably engaged, and means interposed between the valve operating member and said valve core for selectively rotating said valve operating means together with and independently of said guide whereby to sequentially rotate and tilt the valve core.

7. A valve comprising a valve body having inlet and outlet openings, a valve core mounted for rotative and tilting movements within the valve body, a valve stem connected to the valve core, a rotatable guide member having driving engagement with the valve stem, the guide and valve stem having cooperative guide surfaces limiting relative motion therebetween to straight line motion, a cylindrical collar non-rotatably engaging the valve stem, a rotatable valve operating member having a socket disposed eccentrically with respect to the axis of rotation thereof, said collar being rotatably engaged in said socket, and means interposed between the valve operating means and said valve core for selectively locking the valve operating member and guide means for rotation together and for locking the guide means against rotation while permitting the valve operating member to rotate with respect to the guide to shift said collar in accordance with the eccentricity of said socket.

8. A valve comprising a valve body having inlet and outlet openings, a valve core mounted for rotative and tilting movements within the valve body, a valve stem connected to the valve core, a rotatable guide member having driving engagement with the valve stem, the guide and valve stem having cooperative guide surfaces limiting relative motion therebetween to straight line motion, a cylindrical collar non-rotatably engaging the valve stem, a rotatable valve operating member having a socket disposed eccentrically with respect to the axis of rotation thereof, said collar being rotatably engaged in said socket, a clutch interposed between the valve operating member and said guide for rotating the guide from said valve operating member, and means for releasing said clutch after predetermined rotation of the guide to permit rotation of the valve operating member with respect to the guide for shifting the collar within the body to tilt the valve core.

9. A valve comprising a valve body having inlet and outlet openings, a valve core mounted for rotative and tilting movements within the valve body, a valve stem connected to the valve core, a rotatable guide member having driving engagement with the valve stem, the guide and valve stem having cooperative guide surfaces limiting relative motion therebetween to straight line motion, a cylindrical collar non-rotatably engaging the valve stem, a rotatable valve operating member having a socket disposed eccentrically with respect to the axis of rotation thereof, said collar being rotatably engaged in said socket, a clutch interposed between the valve operating member and said guide for rotating the guide from said valve operating member, means for releasing said clutch after predetermined rotation of the guide, and for locking the guide with respect to the valve body whereby upon continued rotation of the valve operating member the valve core is restrained against rotation and is tilted about an axis transverse to its axis of rotation due to relative rotation of the collar with respect to the eccentric socket.

ALFRED G. HEGGEM.